United States Patent [19]

Holder et al.

[11] E Re. 28,723

[45] Reissued Feb. 24, 1976

[54] POLYCARBONATE RESINS BLENDED WITH ACRYLATE ELASTOMERS FOR IMPROVED IMPACT STRENGTH

[75] Inventors: Charles B. Holder; Isaac D. Rubin, both of Wappingers Falls; Carmen M. Cusano, Poughkeepsie, all of N.Y.

[73] Assignee: Texaco Inc., New York, N.Y.

[22] Filed: April 10, 1974

[21] Appl. No.: 459,744

Related U.S. Patent Documents

Reissue of:

[64] Patent No.: 3,742,088
Issued: June 26, 1973
Appl. No.: 104,789
Filed: Jan. 7, 1971

[52] U.S. Cl. ..... 260/873

[51] Int. Cl.[2] ..... C08L 67/06

[56] References Cited

FOREIGN PATENTS OR APPLICATIONS

| | | | |
|---|---|---|---|
| 992,503 | 5/1965 | Great Britain | 260/873 |
| 1,182,807 | 3/1970 | Great Britain | 260/873 |

OTHER PUBLICATIONS

Chem. Absts. 68: 13709s, Sakuma, Thermoplastic–Components.

Chem. Absts. 69: 3515q, Lund et al. ABS–Thermoplastics.

Chem. Absts. 74: 142829d; Kato; "Thermoplastic Acrylic Composition."

Chem. Absts. 72(1970): 56386j, Heiss; "Thermoplastic Polycarbonate Molding Composition."

*Primary Examiner*—Harold D. Anderson

*Attorney, Agent, or Firm*—Thomas H. Whaley, C. G. Ries, Henry W. Archer

[57] ABSTRACT

The properties, in particular the impact strength, of polycarbonate resins having an average molecular weight of at least 8000 are improved by blending such resins with from about 3% to about 35% by weight of at least one elastomer characterized by an average molecular weight ranging from about 100,000 to about 2,000,000 and a second order transition (Tg) below 0°C.

5 Claims, No Drawing Figures

POLYCARBONATE RESINS BLENDED WITH ACRYLATE ELASTOMERS FOR IMPROVED IMPACT STRENGTH

The present invention relates to polymers. More particularly, this invention is concerned with improving the impact strength of polycarbonate resins both at low and at room temperatures.

It is well known to those skilled in the polymer art that polycarbonate resins have high impact strength below a critical thickness of between ⅛ and ¼ inches. Above this thickness their impact strength is low. Additionally, the impact strength of polycarbonate resins decreases rapidly with decreasing temperatures and also after aging the polymers at elevated temperatures. These characteristics consequently limit the fields of application of these resins. Thus, thick polycarbonate bodies cannot be used where high impact strength is needed, nor at low or high temperatures when at least good impact strength is needed.

Numerous attempts have been made to remedy the above-outlined shortcomings of polycarbonate resins but heretofore such attempts have not been successful technically or from the economic standpoint.

The present invention resides in the concept of improving the properties of polycarbonate resins by incorporating therein elastomers such as polyacrylate rubbers, polymethacrylate rubbers, or poly(butadiene-acrylonitrile) rubbers. Unobviously and unexpectedly, it was discovered that the incorporation of such elastomers had no deleterious effect on the heat deflection temperature of the polycarbonate resins when, in fact, those skilled in this art would have expected a significant decrease in this property upon adding to the polycarbonate resin a material with a low second order transition temperature. Also unexpected was the observation that the addition of such rubbers only very slightly decreased the tensile properties of the resins.

In the practice of the invention, from about 3% to about 35% by weight of at least one elastomer having an average molecular weight of between about 100,000 and about 2,000,000 and a second order transition below 0°C. is blended with a polycarbonate resin having an average molecular weight of at least 8000. Preferred elastomers for the purposes of this invention are lower alkyl acrylate polymers and copolymers of lower alkyl acrylates with stearyl acrylates and mixtures thereof. Optimum amounts of elastomers in the blend range from 5 to 20 per cent by weight. The blends of the invention are prepared in conventional manner using conventional blending equipment such as blenders, roll mills and the like. They can also be molded in conventional fashion at temperatures usually ranging from about 370°F. to 400°F. Naturally, the blends of this invention can contain any and all desired additives known to those skilled in this art such as fibers, antioxidants, lubricants, etc.

The unexpected nature of the results obtained by the practice of the present invention can best be appreciated against the background of the tabulation appearing in Table I of the physical properties of a typical polycarbonate resin, compared with the properties of blends made in accordance with the invention.

TABLE I

| Sample No. | Mill Temp. F/R/°F. | Mold Temp. °F. | Izod. Impact Ft. Lb. Per In. Notch | | Heat Deflect Temp., °C. | | Elastic Modulus, X10⁻³ psi. | Tensile Strength, psi | | Percent Elong. At Break | Temp. Of Tests | Remarks |
|---|---|---|---|---|---|---|---|---|---|---|---|---|
| | | | Bar, 73°F. | | At 264 PSI., Deflect., ⅛ In. Bar | | | At Yield | At Break | | | |
| | | | ¼" | ⅛" | 0.01" | 0.02" | | | | | (Izod Impact) | |
| 1. | 500/500 | 370°F. | 2.9 | 16.0 | 134.0 | 137.0 | 290.9 | 8785 | 8518 | 102 | R.T. | Polycarbonate Resin |
| | | | 1.1 | 3.7 | | | | | | | −20°C. | (100%) |
| | | | 1.2 | 4.8 | | | | | | | −40°C. | |
| 2. | 500/500 | 370 | 14.8 | 13.3 | 132.5 | 136.5 | 250.2 | 7106 | 7068 | 49 | R.T. | Polycarb. Resin−190 parts |
| | | | 3.8 | 9.4 | | | | | | | −20°C. | Butyl Acrylate Rubber[1] |
| | | | 3.1 | 6.0 | | | | | | | −40°C. | 10 Parts (5%) |
| 3. | 500/500 | 370 | 14.0 | 14.3 | 132.5 | 136.0 | 275.0 | 8257 | 8341 | 123 | R.T. | Polycarb. Resin−180prts |
| | | | 9.0 | 11.7 | | | | | | | −20°C. | Butylacrylate Rubber[1] |
| | | | 4.6 | 9.7 | | | | | | | −40°C. | 20 Parts (10%) |
| 4. | 500/500 | 390 | 15.5 | 13.8 | 135.5 | 138.5 | 266.5 | 7182 | 8209 | 135 | R.T. | Polyc. Resin 202.5 prts |
| | | | 4.5 | 8.8 | | | | | | | −20°C. | Ethylacrylate Rubber[2] |
| | | | 3.3 | 4.4 | | | | | | | −40°C. | 22.5 Parts (10%) |
| 5. | 500/500 | 390 | 15.0 | 17.0 | 132.0 | 137.0 | 254.6 | 7023 | 7969 | 123 | R.T. | Polyc. Resin 202.5 prts |
| | | | 14.2 | 14.7 | | | | | | | −20°C. | Rubber[a] 22.5 parts (10%) |
| | | | 4.8 | 7.3 | | | | | | | −40°C. | |
| 6. | 500/450 | 400 | 11.2 | 11.7 | 131.0 | 135.5 | 195.0 | – | 4620 | 10 | R.T. | Polyc. Resin−120g. |
| | | | 11.1 | 4.2 | | | | | | | −20°C. | Rubber[a]−30g. (20%) |
| | | | 3.3 | 1.9 | | | | | | | −40°C. | |

Notes
a. Copolymer of 80 Wt. % Butyl Acrylate and 20% Stearyl Acrylate. Tg=−70°C.
1. Butyl Acrylate Rubber (MW=327,000), Tg=−55°C.
2. Ethyl Acrylate Rubber (MW=327,000), Tg=−24°C.

Consideration of the data in Table I shows that mprovements were particularly dramatic in the mpact strength of ¼ in. bars. Thus, sample 3 con- aining 10 wt. % of a butyl acrylate rubber having a umber average molecular weight of 327,000 had a room temperature impact strength of 14.3 ft. b./in. notch, a −20°C. impact strength of 9.0 and a -40°C. strength of 4.6. Substantial improvements were also obtained in the low temperature impact strengths of the ⅛ inch bars.

It is clear from the data that all three of the rub- bers used had a beneficial effect. For best perform- ance at low temperatures rubbers with low second order transitions (Tg) are preferred. This is shown by the data from the samples 4 and 5. The rubber used in sample 5 had a Tg of about −60° to −70°C. while that in sample 4 had one of about −24°C. The rubber with the lower Tg gave blends with better -20°C. and −40°C. impact strengths.

Table II below illustrates annealing data of poly- carbonate resins using poly(methyl methacrylate) (PMMA) and poly(Neodol 25L methacrylate). The data given show that the second order transition (Tg) of the polymer used is very important. Thus it will be noted that PMMA, which has a Tg of 105°C., is not effective for the purposes of the invention.

Results substantially equivalent to those appear- ing above are obtained also when poly(butadiene acrylonitrile) rubbers are used instead of polyacrylate or polymethacrylate rubbers. Similar results are obtainable by using mixtures of the above rubbers.

TABLE II

| Izod Impact Data on ⅛" Specimens ft. lb./in. notch | | | |
|---|---|---|---|
| Sample (Composition in per cents) | 73°F. | −40°F. | Tg |
| 90 Polycarbonate-10 Poly(Butyl Acrylate) | | | −65°C. |
| Unannealed | 14.4 | 11.5 | |
| Annealed (6 hr. at 120°C) | (13.2)[a] | 6.2 | |
| 90 Polycarbonate 10 Poly(methyl meth-acrylate) | | | +105°C. |
| Unannealed | 11.4 | 0.7 | |
| Annealed (6 hr. at 120°C) | 0.8 | 0.6 | |
| 90 Polycarbonate 10 Poly(Neodol 25L meth-acrylate)[1] | | | −75°C. |

TABLE II—Continued

| Izod Impact Data on ⅛" Specimens ft. lb./in. notch | | | |
|---|---|---|---|
| Sample (Composition in per cents) | 73°F. | −40°F. | Tg |
| Unannealed | 13.6 | 4.0 | |
| Annealed (6 hr. at 120°C) | 12.9 | 2.9 | |

[1]) Neodol 25 L. methacrylate—Neodol 25L is a commercial lauryl alcohol: the methacrylate was made from it.
[a]) Value obtained by annealing for 25 hr. at 120°C.

Polycarbonate resins (PC) have the shortcoming that their impact strength is drastically reduced if the material is annealed below its Tg (140°C.) It has been shown that as little as 3 hours at 102°C. can cause its impact strength to decrease from 16 to 2 ft. lb./in. notch. The data above given proves that the poly(butyl acrylate)-PC blend does not exhibit this behavior but rather maintains its high impact strength even after annealing for 25 hours at 102°C. This heat resistance makes the composition of the invention useful, interalia, in auto body components and applicance housings.

What is claimed is:

1. A polycarbonate resin composition characterized by increased impact strength and comprising a blend of polycarbonate resin having an average molecular weight of at least 8000 and from about 3 to 35 percent by weight based on the weight of polycarbonate—elastomer blend of at least one elastomer having an average molecular weight between about 100,000 and 2,000,000 with a second order transition below 0°C., said elastomer being selected from the group consisting of *a copolymer of* lower alkyl acrylate*s* with stearyl acrylates, *lower alkyl acrylate homopolymers* and lauryl methacrylate rubber [ and poly(methyl methacrylate ] .

2. The composition as defined in claim 1 containing from 5 to 20 percent by weight of said elastomer.

3. The composition as defined in claim 1 containing 95 to 90 percent by weight of polycarbonate resin and 5 to 10 percent by weight of butyl acrylate polymer having a number average molecular weight of 327,000.

4. The composition as defined in claim 1 containing 202.5 parts of polycarbonate resin and 22.5 parts of ethylacrylate polymer.

5. The composition as defined in claim 1 containing polycarbonate resin and 10 to 20 percent [ parts ] by weight of a copolymer of 80 weight percent butylacrylate and 20 percent stearyl acrylate.

* * * * *